(12) United States Patent
Glanz

(10) Patent No.: US 8,827,098 B2
(45) Date of Patent: Sep. 9, 2014

(54) COLLAPSIBLE LID HANDLE FOR COOKWARE

(76) Inventor: Daniel Glanz, Mevaseret Zion (IL)

( * ) Notice: Subject to any disclaimer, the term of this patent is extended or adjusted under 35 U.S.C. 154(b) by 487 days.

(21) Appl. No.: 13/241,449

(22) Filed: Sep. 23, 2011

(65) Prior Publication Data

US 2013/0075397 A1 Mar. 28, 2013

(51) Int. Cl.
*B65D 25/28* (2006.01)
(52) U.S. Cl.
CPC ..................................... *B65D 25/28* (2013.01)
USPC ........ 220/212.5; 220/770; 220/759; 220/764; 220/761; 220/573.1

(58) Field of Classification Search
CPC ...................................................... B65D 25/28
USPC .............. 220/770, 759, 762, 764, 776, 573.1, 220/912, 696, 710.5, 752, 754, 753, 755, 220/756, 757, 758, 761, 768, 771, 212.5, 220/318
See application file for complete search history.

(56) References Cited

U.S. PATENT DOCUMENTS

| 3,401,827 | A | 9/1968 | Messina et al. |
| 4,944,399 | A | 7/1990 | Ten Bruggencate et al. |
| 4,974,742 | A | 12/1990 | Farrell et al. |
| 5,373,708 | A | 12/1994 | Dumoulin, Jr. |
| 5,467,915 | A | 11/1995 | Mattson |
| 2003/0209551 | A1* | 11/2003 | Park ........................... 220/573.1 |
| 2005/0077303 | A1* | 4/2005 | Minner et al. ................ 220/574 |
| 2005/0205577 | A1* | 9/2005 | Park ........................... 220/367.1 |
| 2009/0020538 | A1* | 1/2009 | Rhetat et al. ................ 220/573.1 |
| 2010/0089246 | A1* | 4/2010 | Yang ............................... 99/403 |
| 2011/0168729 | A1* | 7/2011 | Koenig et al. ................. 220/761 |
| 2012/0199582 | A1* | 8/2012 | Cai .......................... 220/203.04 |

OTHER PUBLICATIONS

REI, GSI Outdoors Pinnacle Dualist Cook System—item No. 783287, Web page, accessed: May 6, 2011.
REI, GSI Outdoors Bugaboo Base Camper Cookset—Large—item No. 784110, Web page, accessed: May 6, 2011.

* cited by examiner

*Primary Examiner* — Robert J Hicks
*Assistant Examiner* — Kareen Rush
(74) *Attorney, Agent, or Firm* — Michael J. Feigin, Esq.; Feigin & Associates, LLC

(57) ABSTRACT

In one embodiment, a lid for a vessel has a generally planar body with top side and bottom side, a handle receptacle extending below the bottom side of the generally planar body, and a grasping portion of a handle adapted to fit within the handle receptacle which is rotatably movable between two configurations. In a fully extended configuration, the grasping portion of the handle rises above the top side of the generally planar body of the lid. In a fully retracted configuration, the grasping portion of the handle is fully beneath the generally planar body of the top side of the lid. A combined height of the lid and the vessel, when the lid is engaged with the vessel, may be at least 23.8% less when in the fully retracted configuration compared to the fully extended configuration.

14 Claims, 4 Drawing Sheets

COLLAPSIBLE LID HANDLE FOR COOKWARE

FIELD OF THE DISCLOSED TECHNOLOGY

The disclosed technology relates generally to handles and more specifically to collapsible handles.

BACKGROUND OF THE DISCLOSED TECHNOLOGY

There is a need in the art to provide sturdy cookware that takes up as little space as possible. Pots, pans, and so forth, typically have a body with extending handle. While a smaller pot takes up less space on the cooktop and the closet, the obvious downside is the reduced capacity of the pot. Regarding the pot handle. It may be permanently attached, foldable or removable; this impacts on strength of the handle and its connection to the pot, as removable attachments are generally weaker than attachments fixed by welding or any other method known in the art.

Examples of the prior art include U.S. Pat. No. 4,944,399 to Bruggencarte which has an integral foldable handle. Another, U.S. Pat. No. 4,974,742 to Farrell et al. discloses foldable handles for microwavable bowls and the like. Another, U.S. Pat. No. 5,373,708 to Dumoulin, Jr., utilizes a pop-up handle. In each of the above cases, the handles accomplish a goal of decreasing space used during storage; however, such handles are limited in the amount of torque and other forces they can withstand. That is, products with foldable handles do not last as long, as regular cookware and cannot be substituted for an average pot found in a kitchen. Further, the handles and cookware of much of the prior art must be held at a particular orientation to avoid undesired folding.

What is needed in the art is a way to obviate the space used by handles, so as to allow cookware and other items with handles to fit into cramped spaces such as refrigerators and backpacks, without sacrificing strength and utility. The handle, ideally, should be as good as a non-foldable handle.

SUMMARY OF THE DISCLOSED TECHNOLOGY

An object of the disclosed technology is to provide a pot with lid, whereby the lid does not extend past the top of the body of the lid.

In one embodiment, a lid for a vessel has a generally planar body with top side and bottom side, a handle receptacle extending below the bottom side of the generally planar body, and a grasping portion of a handle adapted to fit within the handle receptacle which is rotatably movable between two configurations. In a fully extended configuration, the grasping portion of the handle rises above the top side of the generally planar body of the lid;. In a fully retracted configuration, the grasping portion of the handle is fully beneath the generally planar body of the top side of the lid, within an area bounded on it's sides and it's bottom by the handle receptacle. In this embodiment, a spring may press against the handle receptacle and the grasping portion of the handle in both the fully extended and fully retracted configurations. A flange, integrated with the grasping portion of the handle, may abut the lid in the fully extended configuration. The grasping handle and the receptacle may further comprise threads adapted for engagement with each other. A combined height of the lid and the vessel, when the lid is engaged with the vessel, may be at least 23.8% less when in the fully retracted configuration compared to the fully extended configuration.

In another embodiment, a kit with a pot and lid, or multiple pots with multiple corresponding lids, is claimed. Each respective pot and lid adapted to cover a pot, has retractable side handles (on the pot) and a retractable lid handle (on the lid). The retractable lid handle (in it's entirety) retracts downwards to at or beneath the upper most extremity of other parts of the lid. The upper most extremity of the lid is defined as the extreme furthest away portion thereof, on an opposite side of a side of the lid which faces the pot. A spring in the retractable lid handle may cause the lid handle to fully extend, but threads are used to retract the handle by way of a twisting motion to rotate the handle. Friction between the threads maintains the lid handle in a retracted position despite force of the spring acting to fully extend the handle. When using multiple pots, an upper pot sits flat on a lower pot when the lower pot's handle is retracted, but when extended, the upper pot is prevented from sitting flat, or sits at an (unstable) angle on the lower pot.

In a method of using a pot with lid, one rotates a lid handle such that the lid handle is beneath an upper plane of a top of the rest of the lid when storing the pot with contents therein. One rotates a lid handle such that the lid handle is above the upper plane of the top of the rest of the lid when using the pot, where "use" is defined as cooking with the pot. Flanges on the lid handle prevent disconnection of the lid handle form the lid during regular operational use, where "operational use" in this instance is defined as cooking or storing.

In accordance with these and other objects, which will become apparent hereinafter, the disclosed technology will now be described with particular reference to the drawings.

A better understanding of the disclosed technology will be obtained from the following detailed description of the preferred embodiments, taken in conjunction with the drawings and the attached claims.

DETAILED DESCRIPTION OF EMBODIMENTS OF THE DISCLOSED TECHNOLOGY

The disclosed technology comprises a lid with collapsible handle. Embodiments of the disclosed technology will become clearer in view of the discussion of the drawings, below.

Figure 1A:
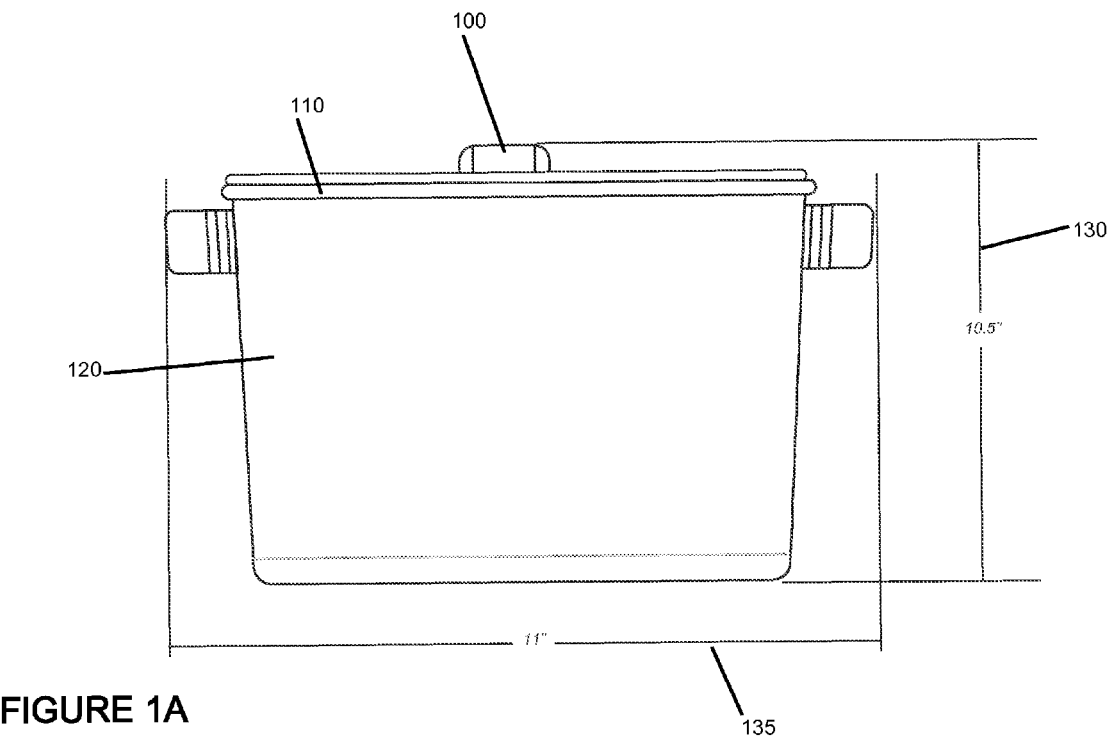
FIG. 1A shows a side view of a pot with extended lid handle of an embodiment of the disclosed technology.

FIG. 1A shows a side view of a pot with extended lid handle of an embodiment of the disclosed technology. The pot 120 has a lid 110, the lid having a lid handle 100. The lid is fixedly attached to the lid handle, the lid adapted to cover an open side of the pot. As shown in the figure, the width of the pot is 11 inches, and the height is 10.5 inches. These are marked as width 135 and height 130 and are by way of an example of an embodiment of the disclosed technology.

Figure 1B:
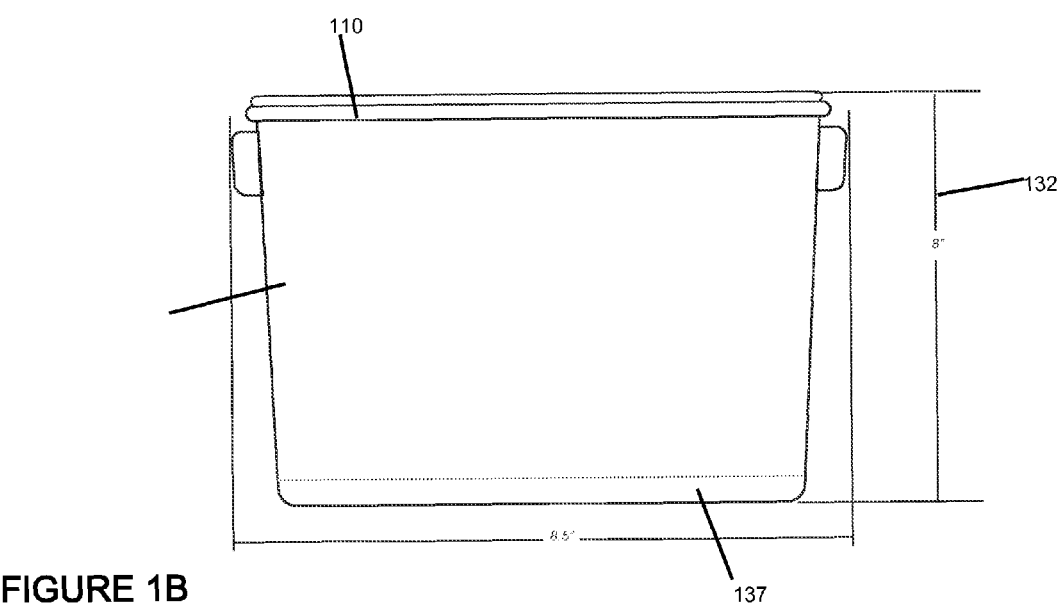
FIG. 1B shows a side view of the pot of FIG. 1A with a collapsed lid handle.

FIG. 1B shows a side view of the pot of FIG. 1A with a collapsed lid handle. Here, the side handles and lid are collapsed. The side handles are the subject of another patent application to the same inventor being filed at the U.S. Patent Office on the same date as this application, entitled, "COLLAPSIBLE HANDLES FOR COOKWARE" and is hereby expressly incorporated by reference. The width 135 has decreased to width 137, but more importantly for this technology, the height has decreased to height 132 which is 8". A full 2.5" inches of height is decreased, which amounts to a 23.8% decrease in height. This allows the pot to be stored easier (requiring less space) and further, gives the pot lid a flat top (defined whereby the upper extremity of the handle is flush or beneath the planar surface of the top of the pot lid or the highest point of the pot lid). This enables one to stack pots on top of one another in a stable manner. Through modification of the height of the pot or the handle, one skilled in the art will appreciate that decreases in overall height may be anywhere between 5% and 35%, such as greater than 15%, 20% 25%, or 30%.

Figure 2:
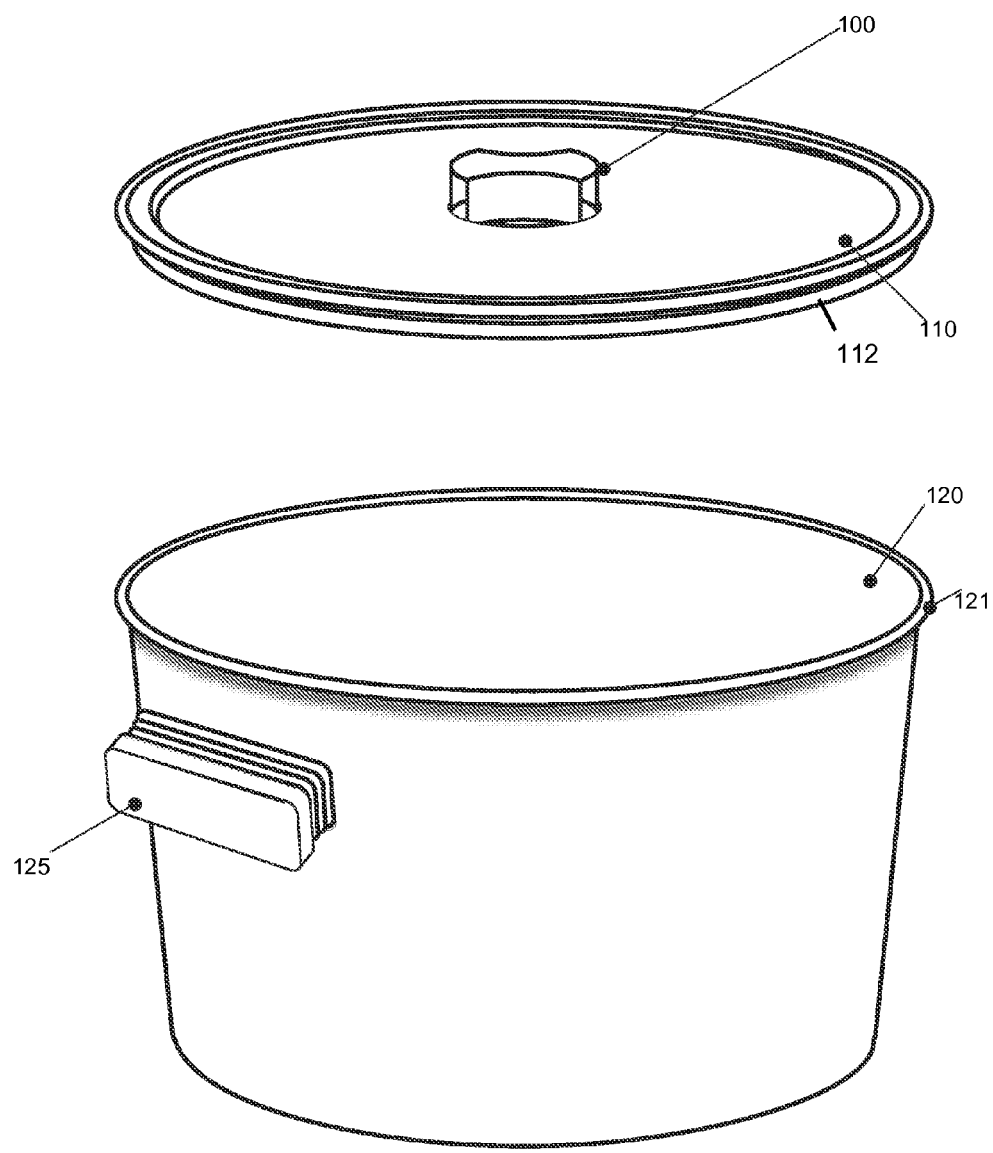
FIG. 2 shows a perspective view of a pot with lid of an embodiment of the disclosed technology.

FIG. 2 shows a perspective view of a pot with lid of an embodiment of the disclosed technology. In the perspective view, it may be appreciated that the handle 100 appears a regular, functioning handle to grab the pot, and the handle so functions to grab lid 110 which has an underside 112. The underside 112 fits within the circumference of the opening of pot 120 formed between the rim of the pot 121. A handle 125 is also shown and may further be collapsible.

Figure 3A:
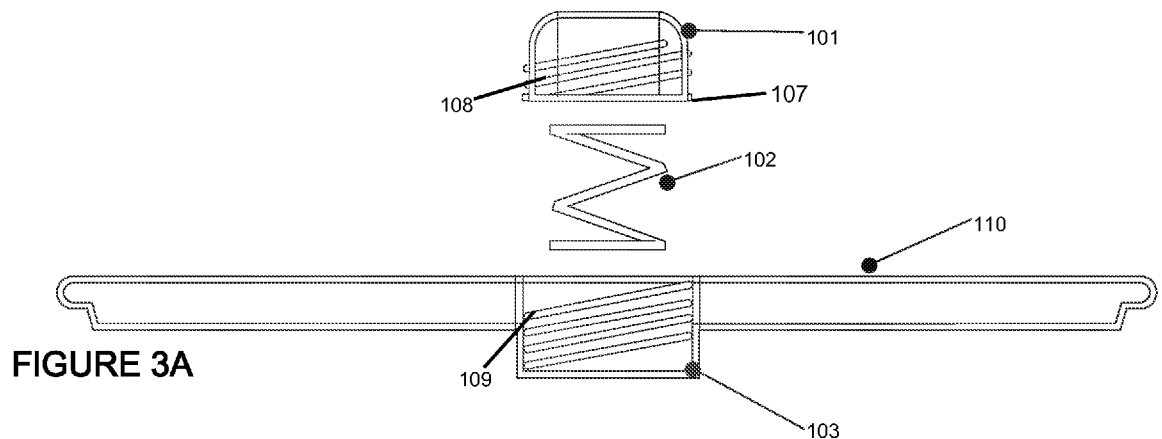
FIG. 3A shows a side cutaway and exploded view of a lid of an embodiment of the disclosed technology.
Figure 3B:
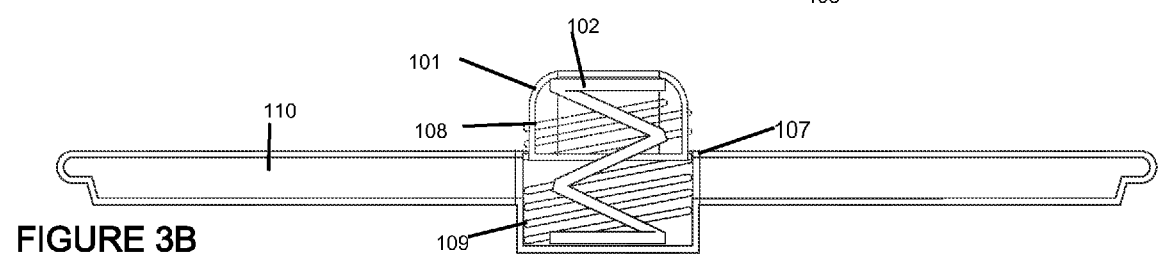
FIG. 3B shows a side cutaway view of connected parts of the lid handle shown in FIG. 3A.

FIG. 3A shows a side cutaway and exploded view of a lid of an embodiment of the disclosed technology. FIG. 3B shows a side cutaway view of connected parts of the lid handle shown in FIG. 3A.

Figure 3C:
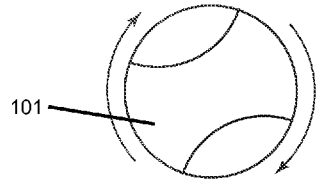
FIG. 3C shows a top plan view of a lid handle of an embodiment of the disclosed technology.
Figure 3D:
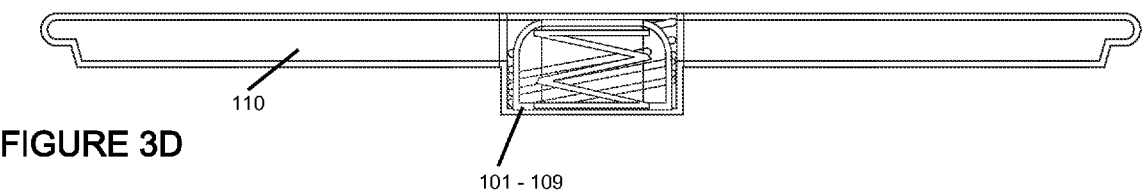
FIG. 3D shows a side cutaway view of the lid handle of FIG. 3B with the lid handle fully collapsed into the lid.

FIG. 3C shows a top plan view of a lid handle of an embodiment of the disclosed technology. FIG. 3D shows a side cutaway view of the lid handle of FIG. 3B with the lid handle fully collapsed into the lid. Elements of the lid handle 100 have been designated numbers 101 through 109. Discussing each of FIG. 3A through 3D simultaneously, the handle 100 has a grasping portion 101 which may be cylindrical, rectangular, rounded, or having elements of each geometric shape, as shown in the figures. The grasping portion 101 has a width less than that of the lid receptacle 103 which forms an integral part of the lid 110. The lid receptacle 103 and the grasping portion 101 of the handle have respective threads 109 and 108 adapted to rotate within one another. In this manner, as shown in FIG. 3C, the grasping portion 101 may be turned or twisted as shown by the arrows, causing the grasping portion 101 of the lid handle 100 to become higher or lower, with respect to the plane of the lid 110.

Referring specifically to FIG. 3D, when the grasping portion of the handle 101 is fully turned, the handle 100 is completely beneath the upper plane of the lid 110. This produces a flat or generally flat surface ("generally flat" being defined as what an ordinary observer would call "flat") on the top of the lid ("top" defined as the side designed to face away from the interior of the pot). To take the handle out again, for use, one need only unscrew (turn the handle the opposite direction) the handle so that it goes back up. A spring 102 is placed within the handle and attaches to the base of the handle receptacle 103 and the grasping portion of the handle 101, or simply is frictionally held in place due to force exerted by the spring the portions 101 and 103. In this manner, the handle 100 "pops" up or has a tendency to rise upwards from the top plane of the lid 110, and remain upwardly disposed. The threads 108 and 109 provide stronger downward forces than the spring, such that when engaged fully, the spring is compressed and the handle is within the lid. Absent the threaded engagement of the threads 108 and 109, the spring, on the other hand, maintains the grasping portion of the handle 101 above the top plane of the lid.

Figure 4A:
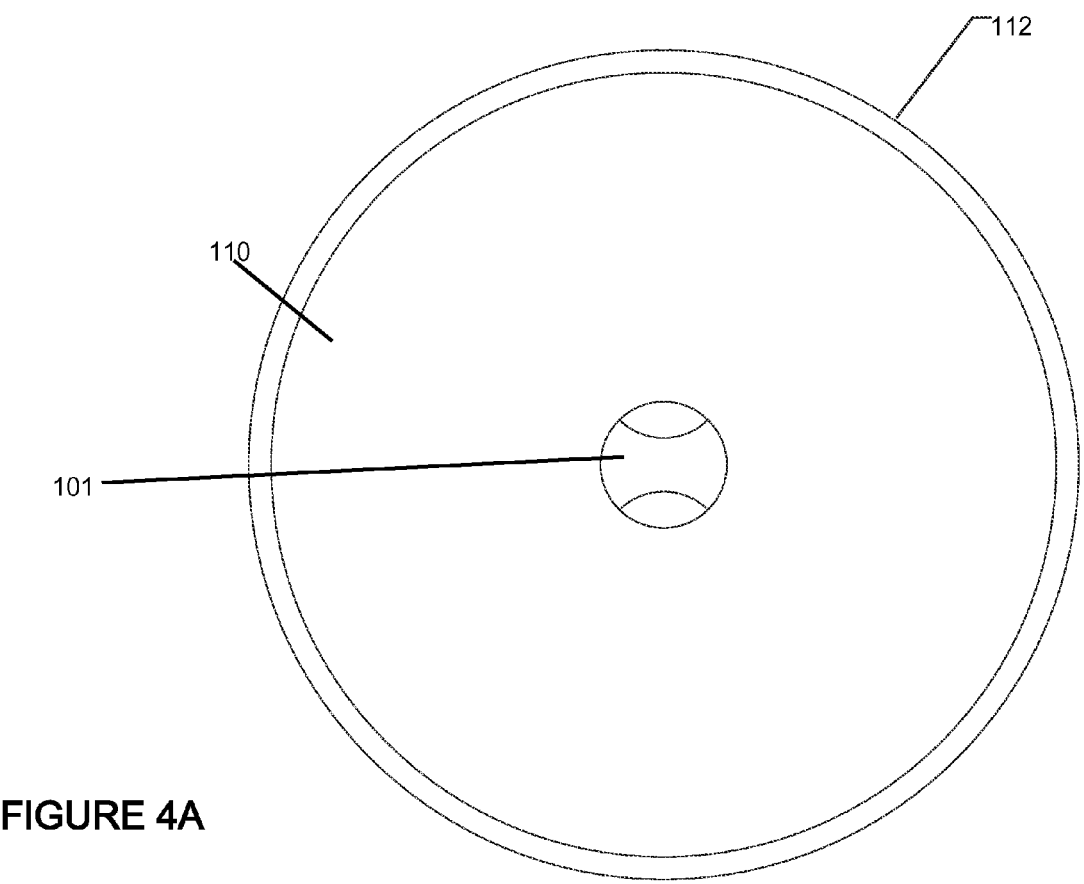
FIG. 4A shows a top view of a lid of an embodiment of the disclosed technology.
Figure 4B:
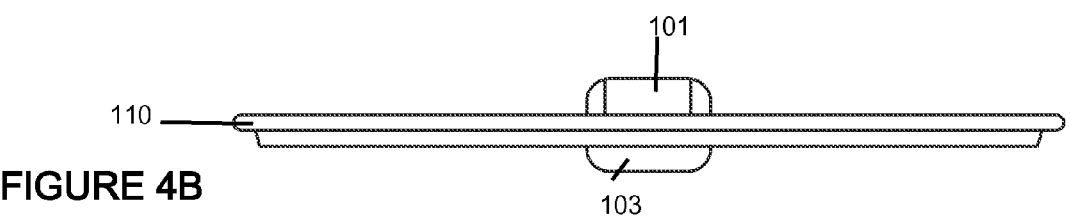
FIG. 4B shows a side view of the lid of FIG. 4A with extended lid handle.
Figure 4C:
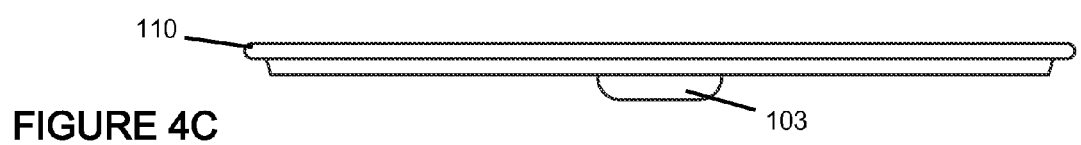
FIG. 4C shows a side view of the lid of FIG. 4A with a collapsed lid handle.

FIG. 4A shows a top view of a lid of an embodiment of the disclosed technology. FIG. 4B shows a side view of the lid of FIG. 4A with extended lid handle. FIG. 4C shows a side view of the lid of FIG. 4A with a collapsed lid handle. The grasping region of the handle 101 may be cylindrical or have sector cutouts or portions of circles cutout on either site of the circle to produce an hourglass shaped handle as shown in FIGS. 4A and 2. The lower region of the handle area, the handle receptacle 103 extends below the plane of the body of the lid 110, the lid being a device adapted to cover a pot or vessel, and the body of the lid being defined as the portion thereof which covers the pot or vessel, up to the top plane and down to the bottom plane of the covering portion. In a first configuration of the lid, the grasping portion of the handle 101 is above the plane of the body of the lid, and in a second configuration, the grasping portion of the handle 101 is below the top plane of the lid 110, as shown in FIG. 4C where the gasping portion is hidden from view, when viewed from the side. The lower portion, or receptacle portion 103 remains below the lower plane of the generally flat lid, regardless of the configuration of the grasping handle 101 with respect to the lid. The receptacle portion 103 provides protection from the content within a pot or the outside elements, and has a hollow area therein for housing of a spring, threads, and grasping portion of a handle 101 when the grasping portion is in a lowered configuration.

Referring now specifically to FIGS. 3A and 3B, a horizontally extending flange 107 extends out from the body of the grasping portion 101 of the handle 100. The extending flange 107 may be a post on either side of the grasping portion 101 or may be a lip extending around the grasping portion 101. This extending flange(s) (or lip) 107 is wider than an opening in the handle receptacle 109, ensuring that the grasping portion 101 cannot be removed from the receptacle 103, in it's entirety, during ordinary use. When the flange 107 abuts part of the lid 110 and/or top of the receptacle 103, this defines the upper most configuration of the handle, above the top plane of the lid and the maximum extension of the spring 102 during ordinary use of the device.

By using pots with flat lids, when the handle is retracted, one may stack multiple pots on top of each other in a balanced and well supported manner. That is, the pots may be stacked two, three, five, or even ten or twelve high. The flat surface on the top provides a surface for a pot above to rest. Or, when using a curvilinear top, such as a convex top, a corresponding curvilinear, such as a concave bottom, of a pot above may sit on the pot below. As the handle is retractacle, when it is retracted, the handle does not get in the way of the stacking of the pots. When extended, the handle, in embodiments of the disclosed technology, precludes stable stacking of pots and forces an upper pot to be at an angle, with respect to the lower pot.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A lid for a vessel and second vessel combination, wherein:
    said lid comprises:
        a generally planar body with top side and bottom side;
        a handle receptacle extending below said bottom side of said generally planar body; and
        a grasping portion of a handle adapted to fit within said handle receptacle is rotatably movable between two configurations:
            a fully extended configuration wherein said grasping portion of said handle rises above said top side of said generally planar body of said lid; and
            a fully retracted configuration wherein said grasping portion of said handle is fully beneath said generally planar body of said top side of said lid within an area bounded on sides and bottom by said handle receptacle;
    wherein in said fully retracted configuration said second vessel sits flat on said lid and in said fully extended configuration said second vessel is prevented from sitting flat on said lid.

2. The lid of claim 1 and second vessel combination, wherein a spring presses against said handle receptacle and said grasping portion of said handle in both said fully extended and said fully retracted configuration.

3. The lid of claim 2 and second vessel combination, wherein a flange, integrated with said grasping portion of said handle, abuts said lid in said fully extended configuration.

4. The lid of claim 3 and second vessel combination, wherein said grasping handle and said receptacle further comprise threads adapted for engagement with each other.

5. The lid of claim 4 and second vessel combination, wherein a combined height of said lid and said vessel, when said lid is engaged with said vessel, is at least 23.8% less when in said fully retracted configuration compared to said fully extended configuration.

6. A kit comprising a pot with lid adapted for covering said pot, said kit further comprising,
    a retractable lid handle on a lid of a lower pot;
    an upper pot having a bottom which sits flat on a lid of a lower pot when said lower pot's said lid handle is retracted;
    wherein said retractable lid handle retracts downwards to at or beneath the upper most extremity of other parts of said lid, wherein said upper most extremity of said lid is on an opposite side of a side of said lid facing said pot and when said retractable lid handle is above said upper most extremity of other parts of said lid of said lower pot, said upper pot is prevented from sitting flat on said lower pot.

7. The kit of claim 6, wherein a spring in said retractable lid handle causes said lid handle to fully extend.

8. The kit of claim 7, wherein threads are used to retract said lid handle by way of a twisting motion of said handle.

9. The kit of claim 8, wherein friction between said threads maintains said lid handle in a retracted position despite force of said spring acting to fully extend said handle.

10. A method of using two stacked pots with lid, comprising:
    rotating a lid handle of a lower pot such that said lid handle is beneath an upper plane of a top of the rest of said lid of said lower pot when storing said pot with contents;
    rotating said lid handle of said lower pot such that said lid handle is above said upper plane of said top of said rest of said lid of said lower pot when using said pot; wherein
    flanges on said lid handle prevent disconnection of said lid handle from said lid; and
    wherein when said lid handle of said lower pot is extended above said upper plane if said top of said rest of said lid of said lower pot, an upper pot is prevented from sitting flat on said lower pot.

11. The method of claim 10, wherein said lid handle of said lower pot extends beneath said lid into a handle receptacle when said lid handle is also beneath said upper plane.

12. The method of claim 11, wherein a spring maintains said lid handle of said lower pot above said upper plane when at least a part of threads of said lid handle are disengaged.

13. The method of claim 12, wherein threads on said lid handle of said lower pot, when engaged, maintain said lid handle to remain below said upper plane of said lid of said lower pot.

14. The method of claim 13, wherein a total height of said pot with said lid of said lower pot is at least 20% less when said lid handle of said lower pot is rotated beneath said upper plane compared to when said lid handle of said lower pot is above said upper plane.

* * * * *